US012566080B2

(12) United States Patent
Zhou

(10) Patent No.: US 12,566,080 B2
(45) Date of Patent: Mar. 3, 2026

(54) SENSING A LINEAR DISPLACEMENT WITH A LEANING MAGNET

(71) Applicant: Melexis Technologies SA, Bevaix (CH)

(72) Inventor: Yubo Zhou, Tessenderlo (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 139 days.

(21) Appl. No.: 18/396,113

(22) Filed: Dec. 26, 2023

(65) Prior Publication Data

US 2024/0219207 A1     Jul. 4, 2024

(30) Foreign Application Priority Data

Dec. 30, 2022     (EP) ..................................... 22217272

(51) Int. Cl.
  G01D 5/14         (2006.01)
  G01D 5/16         (2006.01)
(52) U.S. Cl.
  CPC ............... G01D 5/145 (2013.01); G01D 5/16 (2013.01)
(58) Field of Classification Search
  CPC ................................. G01D 5/145; G01D 5/16
  See application file for complete search history.

(56) References Cited

U.S. PATENT DOCUMENTS

| | | | | |
|---|---|---|---|---|
| 6,823,725 | B2 * | 11/2004 | Lohberg | ................. G01D 5/145 |
| | | | | 324/207.13 |
| 2009/0045807 | A1 * | 2/2009 | Nishida | .................. G01D 5/145 |
| | | | | 324/207.2 |
| 2011/0133725 | A1 | 6/2011 | Dengler | |
| 2019/0368903 | A1 | 12/2019 | Smit et al. | |

FOREIGN PATENT DOCUMENTS

JP          H06229708 A     8/1994

OTHER PUBLICATIONS

Extended European Search Report from corresponding EP Application No. 22217272.8, Jun. 7, 2023.

* cited by examiner

*Primary Examiner* — Reena Aurora
(74) *Attorney, Agent, or Firm* — Workman Nydegger

(57) ABSTRACT

In a first aspect, the present invention relates to a system for sensing a displacement (d) along a direction y of a magnet relative to a sensor, comprising: (i) a sensor for measuring a first magnetic field component $B_u$ along a direction u, and a second magnetic field component $B_z$ along a direction z, substantially orthogonal to u and y; and (ii) a magnet above the sensor in the z-direction, the magnet having a magnetization direction substantially perpendicular to a major surface of the magnet, substantially perpendicular to the z-direction and different from the y-direction.

17 Claims, 6 Drawing Sheets

SENSING A LINEAR DISPLACEMENT WITH A LEANING MAGNET

TECHNICAL FIELD OF THE INVENTION

The present invention relates to systems for magnetically sensing a displacement of a target, and in particular to such systems for sensing a displacement of a magnet relative to a sensor.

BACKGROUND OF THE INVENTION

Systems for sensing a (linear) displacement (or 'stroke') of a magnet relative to a sensor are known in the art and are for instance used as magnetic position sensors. An example of a standard implementation is depicted in FIG. 1, showing a magnet 40 (e.g. a bar magnet) above a sensor 20 sensitive to the magnetic field produced by the magnet 40. The magnet 40 is magnetized along its longitudinal direction, which is also parallel to the displacement d to be sensed. As the magnet 40 moves along the displacement direction d, the magnetic field measured by the sensor 20 changes and this change can be related to the displacement d of the magnet 40.

While this setup works well for relatively short displacements, the maximum displacement which can be sensed in this way is limited. Indeed, the maximum displacement is constrained by the length (longitudinal dimension) of the magnet; typically being about the same order as the length. However, simply increasing the size of the magnet spreads out the magnetic field and thus entails that the field varies more slowly over a given distance, thereby impacting the resolution (or accuracy) that the sensor can achieved. For a typical traditional sensor (which measures the magnetic field in one sensing region), the maximum displacement which can in practice be sensed is therefore limited to about 20-30 mm.

The aforementioned is even more important for a differential sensor (as depicted in FIG. 1), which measures the magnetic field in two sensing regions and yields an output based on the difference between the measurements in these regions. This is useful to achieve a certain immunity against stray magnetic fields, but relies on a (prominent) gradient in the magnetic field and is thus more impact by a dilution of the magnetic field. Accordingly, a typical differential sensor may be well-suited for sensing a displacement of 20 mm or below, but may not be practicable for longer displacements (e.g. 30 mm or higher).

Aside from increasing the size of the magnet, another approach which has been explored is to use a magnet with a more complex (e.g. multipole) design. However, such magnets are typically considerably more difficult to acquire and/or manufacture, impacting their viability in real-world applications.

There is thus still a need in the art for solutions which address at least some of the concerns outlined above.

SUMMARY OF THE INVENTION

It is an object of the present invention to provide good systems for sensing a displacement of a magnet relative to a sensor. It is a further object of the present invention to provide good methods and uses associated therewith. This objective is accomplished by systems, methods and uses according to the present invention.

It is an advantage of embodiments of the present invention that the displacement (along a direction y) can be effectively sensed. It is a further advantage of embodiments of the present invention that the system can be compact.

It is an advantage of embodiments of the present invention that a relatively long displacement can be sensed. It is a further advantage of embodiments of the present invention that large displacements can be sensed while maintain good accuracy.

It is an advantage of embodiments of the present invention that the magnetization direction is substantially perpendicular to a major surface (e.g. two major surfaces) of the magnet. It is a further advantage of embodiments of the present invention that the magnet can have a comparatively simple and conventional design. It is yet a further advantage of embodiments of the present invention that the magnet may be easy to procure and/or manufacture.

It is an advantage of embodiments of the present invention that the sensor may be a differential sensor. It is a further advantage of embodiments of the present invention that the sensor may be relatively immune to stray magnetic fields.

It is an advantage of embodiments of the present invention that with respect to a stationary reference frame, the sensed displacement may be due to a movement of the magnet or of the sensor or both.

It is an advantage of embodiments of the present invention that the magnetic field components of interest can be obtained in several ways.

It is an advantage of embodiments of the present invention that they can be implemented in a relatively straightforward and economical fashion.

To meet the above objective, the present invention advantageously uses a configuration of the magnet with respect to the sensor can be colloquially referred to as a 'leaning magnet'. More specifically, the magnet—which can typically be of a relatively simple design, being magnetized along a direction perpendicular to one of its major surfaces—is oriented at an angle with respect to the displacement direction.

In a first aspect, the present invention relates to a system for sensing a displacement along a direction y of a magnet relative to a sensor, comprising: (i) a sensor for measuring a first magnetic field component $B_u$ along a direction u, and a second magnetic field component $B_z$ along a direction z, substantially orthogonal to u and y; and (ii) a magnet above the sensor in the z-direction, the magnet having a magnetization direction substantially perpendicular to a major surface of the magnet, substantially perpendicular to the z-direction and different from the y-direction.

In a second aspect, the present invention relates to a method for sensing a displacement along a direction y of a magnet relative to a sensor using a system as defined in any embodiment of the first aspect, comprising: (a) measuring a first magnetic field component $B_u$ and a second magnetic field component $B_z$; and (b) determining the displacement of the magnet from $B_u$ and $B_z$.

In a third aspect, the present invention relates to a use of a system according to any embodiment of the first aspect, for sensing a displacement along the direction y of the magnet relative to the sensor.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
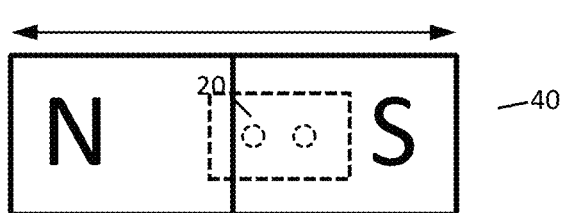
FIG. 1 schematically depicts a top-view of a system for sensing a linear displacement of a magnet relative to a sensor in accordance with the prior art.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

As used herein, and unless otherwise specified, the configuration of various features is specified with the respect to a system of three (substantially) orthogonal directions x, y and z. Reference is also made to a fourth direction u, which is substantially perpendicular to the z-direction; and thus substantially parallel to the xy-plane (e.g. lying in the xy-plane). In some particular embodiments, the u-direction may correspond to (i.e. be parallel to) the x-direction, y-direction or magnetization direction (cf. infra); preferably the x-direction.

As used herein, and unless otherwise specified, when a first entity (e.g. a direction) is said to be substantially parallel/perpendicular to a second entity (e.g. a direction or plane), it is meant that there is a deviation of less than 5° between the first entity and perfect parallelism/perpendicularity with the second entity; preferably less than 3°, more preferably less than 2°, still more preferably less than 1°, such as 0° (or 180°).

As used herein, and unless otherwise specified, when a first entity (e.g. a direction) is said to be at angle with a second entity (e.g. a direction or plane), it is meant that the first and second entity are substantially not parallel (i.e. there is an angle between the first and second entity which is substantially different from 0°/180°). Moreover, it will be evident that a first entity at an angle of m° with a second entity will generally also make a supplementary angle of $(180-m)°$ with said second entity. Herein, typically only the former angle will be detailed.

As used herein, and unless otherwise specified, 1 be evident that this angle refers to the small angle between the magnetization direction and the y-direction, and that their will typically be a further (supplementary) angle between these directions of from 175° to 95°, preferably from 130° to 95°, etc.

Figure 3:
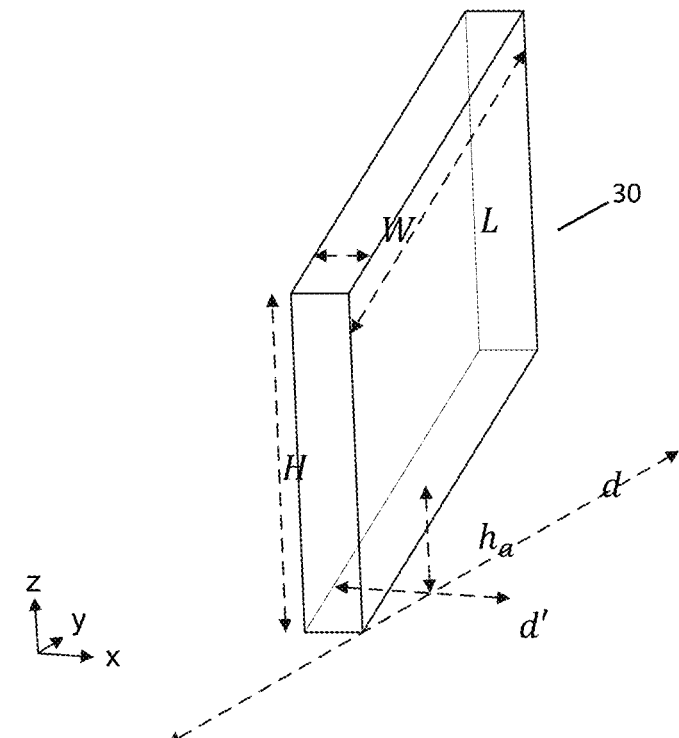
FIG. 3 schematically depicts a three-dimensional view of a bar magnet as in FIG. 2.

As used herein, and unless otherwise specified, the magnet may generally have a height parallel to the z-direction, a width parallel to the magnetization direction, and a length perpendicular to the z-direction and to the magnetization direction (i.e. perpendicular to the height and width). A magnet with height H, width W and length L is schematically depicted in FIG. 3.

In a first aspect, the present invention relates to a system for sensing a displacement along a direction y of a magnet relative to a sensor, comprising: (i) a sensor for measuring a first magnetic field component $B_u$ along a direction u, and a second magnetic field component $B_z$ along a direction z, substantially orthogonal to u and y; and (ii) a magnet above the sensor in the z-direction, the magnet having a magnetization direction substantially perpendicular to a major surface of the magnet, substantially perpendicular to the z-direction and different from the y-direction.

Figure 2:
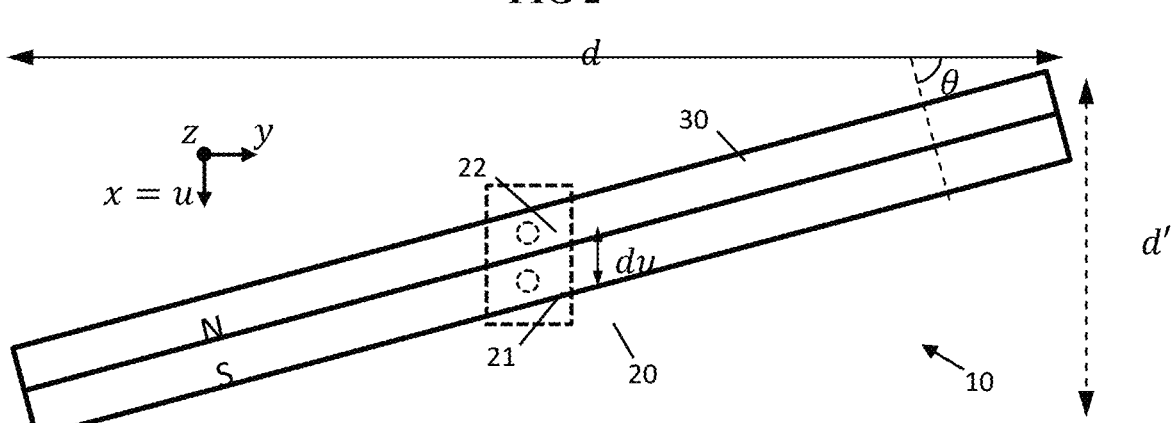
FIG. 2 schematically depicts a top-view of a system for sensing a displacement along a direction y of a magnet relative to a sensor in accordance embodiments of the present invention.

An example of such a system 10 is schematically depicted in FIG. 2; showing sensor 20, a magnet 30 above the sensor 20 having a magnetization direction substantially perpendicular to z (i.e. in the xy-plane) and at angle θ with y, and a displacement d (along the y-direction). Note that as depicted in FIG. 2, u is equal (i.e. parallel) to x.

The present invention relates to a displacement along the y-direction of the magnet relative to the sensor, but it is typically not essential how this relative movement is realized. As such, the relative displacement may—with respect to an external reference frame (e.g. one affixed to the earth)—in embodiments be due to the magnet moving while the sensor remains fixed, or the sensor moving while the magnet remains fixed, or both moving.

In embodiments, the magnet may be above the sensor in the z-direction such that the sensor is sensitive to a magnetic field produced by the magnet. Moreover, the magnet may in embodiments be above the sensor in the z-direction such that a parallel projection of the magnet along the z-direction (e.g. onto the xy- or uy-plane) overlaps with the same parallel projection of the sensor. In other embodiments, the magnet may be above the sensor in the z-direction without said parallel projections overlapping (but nevertheless such that the sensor is sensitive to a magnetic field produced by the magnet). By having the magnet above the sensor in a way that the latter is sensitive to the magnetic field of the former, movement/displacement of the magnet (e.g. along the y-direction) can advantageously be sensed by the sensor as changes in the measured magnetic field components (e.g. $B_u$ and/or $B_z$).

Because the magnetization direction is at an angle with the y-direction, a (long) displacement in the y-direction (i.e. y-displacement) can advantageously be turned into a shorter equivalent stroke (d' in FIG. 2 and FIG. 3) along the x-direction. By tuning the sensor towards the (shorter) equivalent stroke, the y-displacement which can be effectively sensed by the sensor is thereby advantageously lengthened. While the equivalent stroke becomes increasingly short as the angle between the magnetization direction and the u-direction decreases, conversely it may become impossible or impractical for the sensor to pick up on an exceedingly short equivalent stroke. The latter is especially the case when in extremis the equivalent stroke becomes 0 for a magnetization direction parallel to x. Accordingly, the magnetization direction may in embodiments be different from (i.e. not substantially parallel to) the x- and y-direction. Moreover, the magnetization direction may in embodiments be at an angle (θ) of from 5° to 85° with the y-direction, preferably from 30° to 85°, more preferably from 50° to 85°, still more preferably from 60° to 82°, most preferably from 70° to 80°. It will be clear that the optimal angle will typically depend on the sensor used, the (maximum) displacement to be sensed and the desired sensitivity/accuracy therefor. In embodiments, the magnetization direction may be at an angle (φ) of at most 40° with the u-direction, preferably at most 30°, more preferably at most 20°, more preferably at most 15°, most preferably at most 10°; such as at most 5° or 0°.

In embodiments, the magnetization direction being substantially perpendicular to a major surface (e.g. a major face) of the magnet may comprise the major surface having a surface area of at least 15% of the total surface area of the magnet; preferably at least 20%, more preferably at least 25%, still more preferably at least 30%, most preferably at least 35%, such as at least 40% or at least 45%. In preferred embodiments, the major surface may be substantially planar. In embodiments, the magnetization direction may be substantially perpendicular to two major surfaces (e.g. two substantially parallel surfaces) of the magnet. Because the magnetization direction is substantially perpendicular to at least one major surface thereof, magnets for use within the present invention can advantageously be of a comparatively simple and conventional design, which may be easy to manufacture and/or readily commercially available. For example, the magnet may be a block magnet; such as the magnet having the shape of a cuboid, preferably a rectangular parallelepiped.

In embodiments, the magnetization direction may be perpendicular to a longitudinal direction of the magnet. In embodiments, the longitudinal direction may be the length or the height, preferably the length.

Most typically, the width may within the present invention be shorter than the length and height, so that—in contrast to the prior art—the magnetization direction is normally parallel to the shortest dimension of the magnet. In embodiments, an aspect ratio of the length to width (length:width) may be 5:1 or more, preferably 10:1 or more, more preferably 20:1 or more, yet more preferably 30:1 or more; e.g. between 25:1 and 40:1. In embodiments, an aspect ratio of the height to width (height:width) may be 1:1 or more, preferably 1.5:1 or more, more preferably 2:1 or more, yet more preferably 2.5:1 or more.

Moreover,—although not strictly necessarily—the height will often be shorter than the length; especially if a longer displacement is to be sensed. Indeed, even if it is within the present invention more directly the equivalent stroke which is sensed by the sensor, the length of the magnet still (indirectly) plays a role in the maximum displacement which can be sensed. As such, while the use of a longer magnet may typically be advantageous from that point of view, the same is generally not the case for the height. In embodiments wherein the magnetization direction is at an angle $\theta$ with the y-direction, for sensing a displacement d the length may preferably be at least:

$$\frac{d}{\sin\theta}.$$

In embodiments, the magnet may be over the sensor such that there is a space (which can also be referred to as 'air gap') between the magnet and the sensor along the z-direction of between 0.5 and 10 times the width, preferably between 1 and 5 times. Although the sensor is not explicitly drawn in FIG. 3, it may be considered to be in the dd'-plane and there may be an air gap $h_a$ between the magnet and sensor as indicated.

In preferred embodiments, the magnet may be a permanent magnet.

In embodiments, the sensor may comprise a sensing unit for measuring the first magnetic field component $B_u$ along the u-direction and a second magnetic field component $B_z$ along the z-direction. Most preferably, $B_u$ may be $B_x$. The sensor may thus be a sensor with only one sensing region.

In embodiments, the sensor may comprise: (ia) a first sensing unit for measuring in a first sensing region a first magnetic field component $B_{u,1}$ along the u-direction and a second magnetic field component $B_{z,1}$ along the z-direction, and (ib) a second sensing unit for measuring in a second sensing region—aligned to the first sensing region along the u-direction—a first magnetic field component $B_{u,2}$ along the first direction and a second magnetic field component $B_{u,2}$ along the second direction. Most preferably, $B_{u,1}$ may be $B_{x,1}$ and $B_{u,2}$ may be $B_{x,2}$. The sensor may thus be a sensor with at least two sensing regions, such as a differential sensor. A differential sensor advantageously allows to achieve a certain immunity against stray magnetic fields (i.e. it allows rejection of a common mode external perturbation field). Such a sensor 20 with first sensing unit 21 and second sensing unit 22 (aligned along u at a distance du). The sensing regions of the first and second sensing unit are the regions in which they sense their respective magnetic field components $B_{u,1}|B_{z,1}$ and $B_{u,2}|B_{z,2}$. If the magnetic field components in the u- and z-direction within one sensing unit are measured at (substantially) the same point or spot in space, the sensing region is thus simply that point/spot. However, each of the sensors may also comprise distinct sensing elements for determining the magnetic field components in the u- and z-direction. In this case, these sensing elements may not measure at the same point/spot in space but at two points/spots separated by a short distance (typically in the same order of magnitude as the size of the sensing elements, i.e. tens to hundreds of micron; for example between 10 and 200 μm, e.g. between 30 and 100 μm). In such cases, the sensing region is a region (e.g. a 1D or 2D area) defined by and comprising these sensing points or spots.

In embodiments, the sensor—or (each of the) sensing unit(s)—may comprise a first sensing element for measuring $B_u$ (e.g. $B_{u,1}$ or $B_{u,2}$) and a second sensing element for measuring $B_z$ (e.g. $B_{z,1}$ or $B_{z,2}$). In embodiments, the first sensing element(s) may have a maximum axis of sensitivity parallel to the u-direction and the second sensing element(s) may have a maximum axis of sensitivity parallel to the z-direction. The former could for example be vertical Hall elements or magnetoresistance elements; while the latter could for example be horizontal Hall elements.

In some embodiment, the sensor—or (each of the) sensing unit(s)—may comprise sensing elements which do not measure $B_u$ (e.g. $B_{u,1}$ and/or $B_{u,2}$) and $B_z$ (e.g. $B_{z,1}$ and/or $B_{z,2}$) directly. Instead, it may for example comprise sensing elements which measure two other magnetic field components (e.g. $B_x$ and $B_y$) which can be combined into the field component of interest (e.g. $B_u$). Alternatively, it may be made up of two distinct sensing elements but having both a maximum axis of sensitivity parallel to the z-direction (e.g. horizontal hall elements), together with a magnetic concentrator (e.g. a soft magnetic disk). The magnetic concentrator bends the magnetic field lines and allows measurement of both in-plane and out-of-plane magnetic field components by the sensing elements. The sensing elements then output measured field components $B_l$ (e.g. $B_{l,1}$ and/or $B_{l,2}$) and $B_r$ (e.g. $B_{r,1}$ and $B_{r,2}$) which can be linearly combined into the u- and z-field components: $B_u=(B_l-B_r)/2$ and $B_z=(B_l+B_r)/2$.

In embodiments, the system may further comprise signal processing circuitry. In some embodiments, the signal processing circuit may comprise a first difference module for outputting a difference $dB_u$ between $B_{u,1}$ and $B_{u,2}$, and a second difference module for outputting a difference $dB_z$ between $B_{z,1}$ and $B_{z,2}$. In embodiments, the signal processing circuit may further comprise a module for generating an output signal from $B_u$ and $B_z$, or $dB_u$ and $dB_z$. Moreover, the signal processing circuitry may comprise an output generating module (e.g. for calculating an a tan 2 using $B_u$ and $B_z$, or $dB_u$ and $dB_z$) or comprising a lookup table (LUT). This output may in embodiments be sent off-chip through output/ interface.

In embodiments, the sensor and the signal processing circuitry may be integrated in a single integrated circuit (IC); for example on a single IC substrate.

In embodiments wherein the sensor comprises a first and second sensing unit, the first and second sensing units may be integrated in a single integrated circuit (e.g. on a single IC substrate). In such embodiments wherein the system further comprises a signal processing circuitry, the first and second sensing units and the signal processing circuitry may be integrated in the single integrated circuit (e.g. on the single IC substrate).

In embodiments, the system may be (used as) a magnetic position sensor.

In embodiments, any feature of any embodiment of the first aspect may independently be as correspondingly described for any embodiment of any of the other aspects.

In a second aspect, the present invention relates to a method for sensing a displacement along a direction y of a magnet relative to a sensor using a system as defined in any embodiment of the first aspect, comprising: (a) measuring a first magnetic field component $B_u$ and a second magnetic field component $B_z$; and (b) determining the displacement of the magnet from $B_u$ and $B_z$.

In embodiments, the magnet may move—relative to the sensor—substantially parallel to the y-direction. In other embodiments, the magnet may move—relative to the sensor—at angle with the y-direction. Notwithstanding, also in the latter embodiments the displacement along the y-direction may be sensed. In embodiments, the magnet may move substantially linearly. In embodiments, the sensed displacement may be a linear displacement.

In embodiments, the magnet may be above the sensor in the z-direction (cf. supra) over the entire sensed displacement. In preferred embodiments, the magnet may at least be above the sensor in the z-direction such that the sensor is sensitive to a magnetic field produced by the magnet over the entire sensed displacement (but may or may not be above the sensor in the z-direction such that the projections of the magnet and sensor overlap over the entire displacement). In embodiments, the magnet may move at a constant height above the sensor (e.g. over the entire sensed displacement).

In embodiments, the determined displacement may be related to $B_u/B_z$. In other words, step b may comprise determining (e.g. calculating or retrieving from a lookup table; cf. supra) the displacement from $B_u/B_z$.

In embodiments wherein the system comprises two sensing units (cf. supra), step b may comprise determining the displacement of the magnet from $B_{u,1}$, $B_{u,2}$, $B_{z,1}$, and $B_{z,2}$. In embodiments, step b may further comprise calculating a difference $dB_u$ between $B_{u,1}$ and $B_{u,2}$ and a difference $dB_z$ between $B_{z,1}$ and $B_{z,2}$. In embodiments, $dB_u$ may be calculated form $k_u(B_{u,1}-B_{u,2})$ and/or $dB_z$ may be calculated from $k_z(B_{z,1}-B_{z,2})$, wherein $k_u$ and $k_z$ are correction factors. In embodiments, the determined displacement may be related to $$\frac{dB_u/du_1}{dB_z/du_2}.$$

In other words, step b may comprise determining (e.g. calculating or retrieving from a lookup table; cf. supra) the displacement from the aforementioned formula. Herein, $du_1$ is the distance between the two sensing spots at which the magnetic field component $B_{u,1}$ and the magnetic field component $B_{u,2}$ are measured, and $du_2$ is the distance between the two sensing spots at which the magnetic field component $B_{z,1}$ and the magnetic field component $B_{z,2}$ are measured. In other words, $B_{u,1}$ is measured at a first sensing spot (in the first sensing region), $B_{u,2}$ is measured at a second sensing spot (in the second sensing region), $B_{z,1}$ is measured at a third sensing spot (in the first sensing region), and $B_{z,2}$ is measured at a fourth sensing spot (in the second sensing region); and $du_1$ the distance between the first sensing spot and the second sensing spot, and $du_2$ the distance between the third sensing spot and the fourth sensing spot. Indeed, the first and second sensing units—and thus the first and second sensing region—are typically separated from each other by a predetermined distance (typically in the order of mm, such as from 1 mm to 5 mm, preferably from 1.5 mm to 2.5 mm, e.g. 2 mm) along the u-direction. In specific cases, it may be that $du_1=du_2=du$; this is for instance so when the first and second sensing regions are sensing points/spots as such (cf. supra; in which case the first sensing spot (substantially) coincides with the second sensing spot, and the third sensing spot (substantially) coincides with the fourth sensing spot), or simply when the sensing elements are specifically arranged to the effect. In preferred embodiments, an aspect ratio of the sensing region spacing (e.g. $du_1$, $du_2$ and/or du) to magnet width (spacing: width) may be from 1:0.5 to 1:5, preferably from 1:1 to 3:1.

In embodiments, the displacement determined in step b may more specifically be related to a tan $2(B_z, B_u)$ or a tan 2 $(dB_z/du_1, dB_u/du_2)$, wherein a tan $2(y,x)$ is a function which modifies the arctangent a tan$(y/x)$ based on the signs of x and y (i.e. based on a form of quadrant detection) so that the range of the function becomes [0°, 360° ]. Note that the choice of which term to use as x and which as y (i.e. the choice of numerator and denominator in the a tan function) only changes the location of 0°, while the sign of these terms only changes the slope (ascending or descending) of the a tan 2 output, so that both can be arbitrarily selected. As such, the position determined in step b may likewise be related to a tan $2(-y, x)$ a tan $2(x,y)$ or a tan $2(-x,y)$.

In embodiments, determining the displacement in step b may further comprise linearizing an intermediate result (e.g. $B_u$ and $B_z$—or $dB_u/du_1$ and $dB_z/du_2$—as such, the ratio of both or an a tan 2 of both) to obtain the displacement. In some embodiments, linearizing the intermediate result may be performed using a linearization function. Such a linearization function could for example be derived from a measured response of the intermediate results in function of the displacement (see e.g. Example 1 and Example 2). In other embodiments, linearizing the intermediate result may be performed using on a lookup table, optionally using interpolation between the lookup table data points. In embodiments, the lookup table could be based on any of $B_u$ or $B_z$—or $dB_u/du_1$ and $dB_z/du_2$—as such, the ratio of both or the a tan 2 of both. Using the ratio (or the a tan 2, which uses said ratio indirectly) may be advantageous in that it can reduces or cancels out certain influences (e.g. temperature) which impact the numerator and denominator proportionally.

In embodiments, any feature of any embodiment of the second aspect may independently be as correspondingly described for any embodiment of any of the other aspects.

In a third aspect, the present invention relates to a use of a system according to any embodiment of the first aspect, for sensing a displacement along the direction y of the magnet relative to the sensor.

In embodiments, any feature of any embodiment of the third aspect may independently be as correspondingly described for any embodiment of any of the other aspects.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1: Simulations

In order to validate the present invention, various simulations were made using COMSOL modelling software, of which some of the results are depicted in FIG. 4-FIG. 7. The setup for the simulations was as schematically shown in FIG. 2 and FIG. 3. By default the simulations used a bar magnet magnetized along its width and having a length of 50 mm, width of 2 mm and height of 10 mm; an air gap (along z) of 4 mm; a displacement (along y) of up to 40 mm (i.e. −20 mm to +20 mm); and an equivalent stroke (along x) of up to 10 mm.

The results depicted in FIG. 4-FIG. 7 are each time based on a differential sensor (as also shown in FIG. 2—with thus the angular output and/or displacement obtained based on ratio including $dB_u$ and $dB_z$), but the same simulations were also made using a traditional sensor using only one sensing region (with the angular output and/or displacement obtained based on $B_u/B_z$) and these yielded comparable results.

Figure 4:
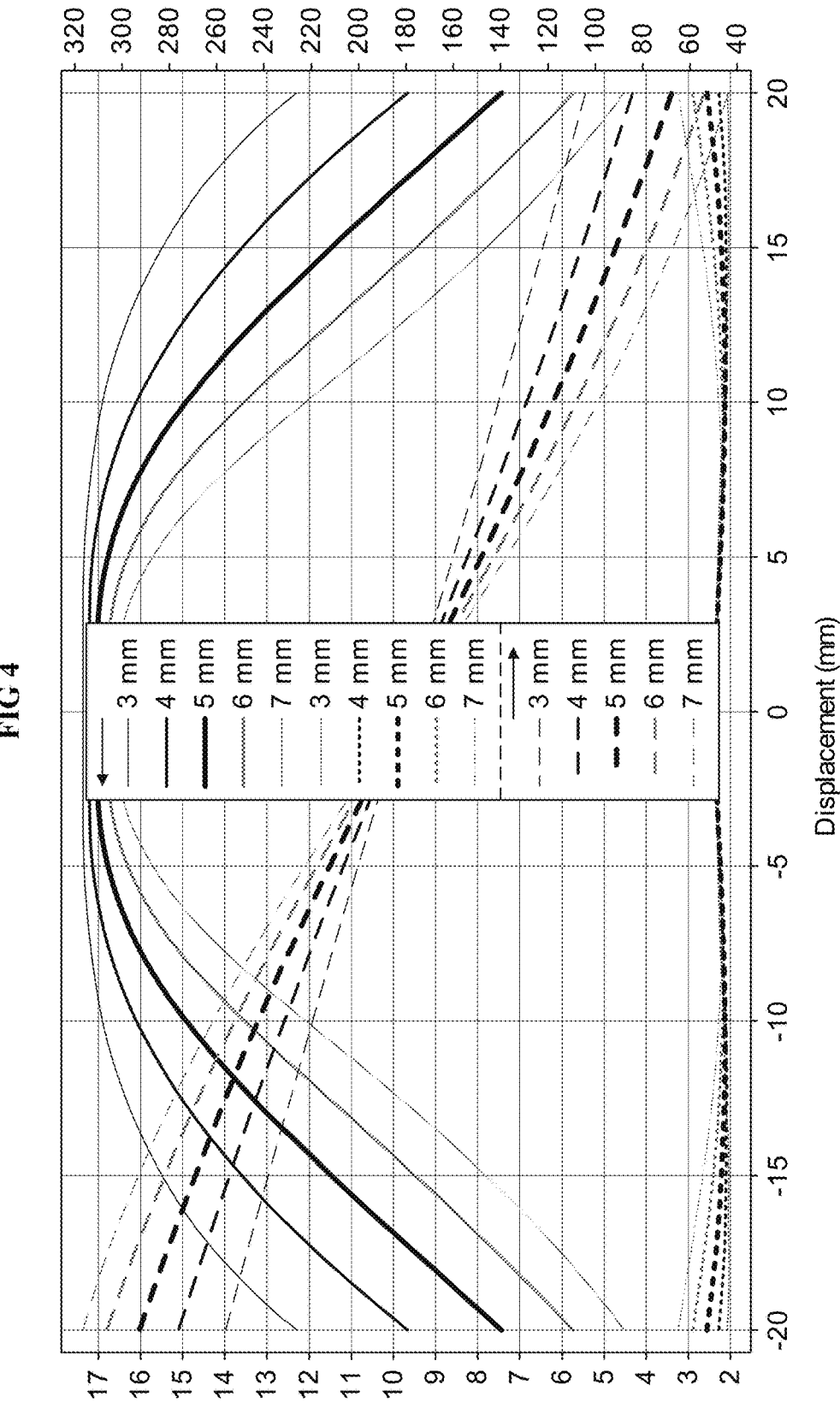
FIG. 4 is a graph showing simulations of the effect of the equivalent stroke (here expressed as equivalent stroke/2) on the gradient (top), angular output (middle) and the common mode error (CMRR; bottom) in accordance with embodiments of the present invention.

We now refer to FIG. 4, showing the simulated results of the effect of the (maximum) equivalent stroke on the gradient (top), angular output (from which the y-displacement can be derived; middle) and the common mode error (CMRR—a measure of the thermal bias; bottom). In this context, the common mode error represents the maximum measurement error over a temperature range of −40 to 160° C. induced by the common-mode magnetic field of the magnet and the sensitivity mismatch between the sensing units in absence of further calibration. This error can be reduced by temperature calibration (e.g. temperature calibration of the magnetic sensitivities and/or temperature calibration of the angular output). The mm-values expressed in the legend of FIG. 4 correspond to half of the equivalent stroke (i.e. d'/2). Note that a change in equivalent stroke here essentially corresponds to a change in the angle θ between the magnet's magnetization direction and the y-direction (i.e. a change in the degree of 'leaning' of the magnet). In other words, the 'lean angle' (i.e. 90°−θ) is related to the y-displacement d and equivalent stroke d' as: a tan 2(d, d').

As can be seen, the simulated results reveal over the whole investigated range an angular output representative of the linear displacement with a good default linearity, a gradient which is sufficiently large (i.e. typically >6 mT/mm) and a CMRR which remains small.

Figure 5:
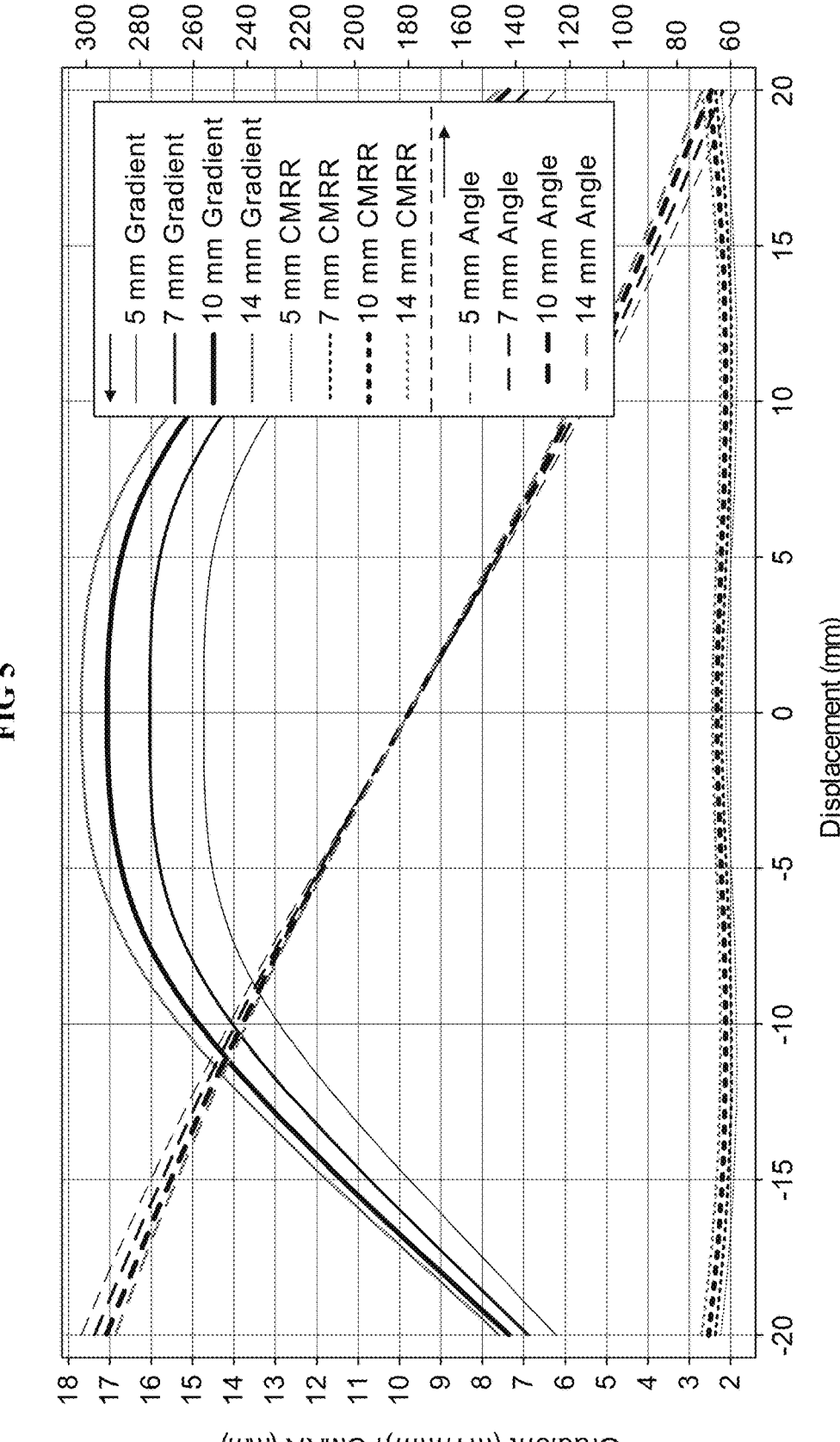
FIG. 5 is a graph showing simulations of the effect of the magnet height on the gradient, angular output and CMRR in accordance with embodiments of the present invention.

We now refer to FIG. 5, showing the simulated results of the effect of the magnet height on the gradient, angular output and CMRR. As can be seen, the simulated results mainly indicate a moderate effect of the magnet height on the useful gradient strength. Notwithstanding, even if the height is reduced to 5 mm, the gradient strength nevertheless remains good at >6 mT/mm over the full displacement. Alongside the effect on the gradient strength, more subdued effects on the angle range (slightly larger for smaller height) and CMRR (slightly smaller for smaller height) are also observed. For the subsequent simulations (cf. FIG. 6 and FIG. 7), a magnet height of 5 mm (rather than the default of 10 mm up to now) was used.

Figure 6:
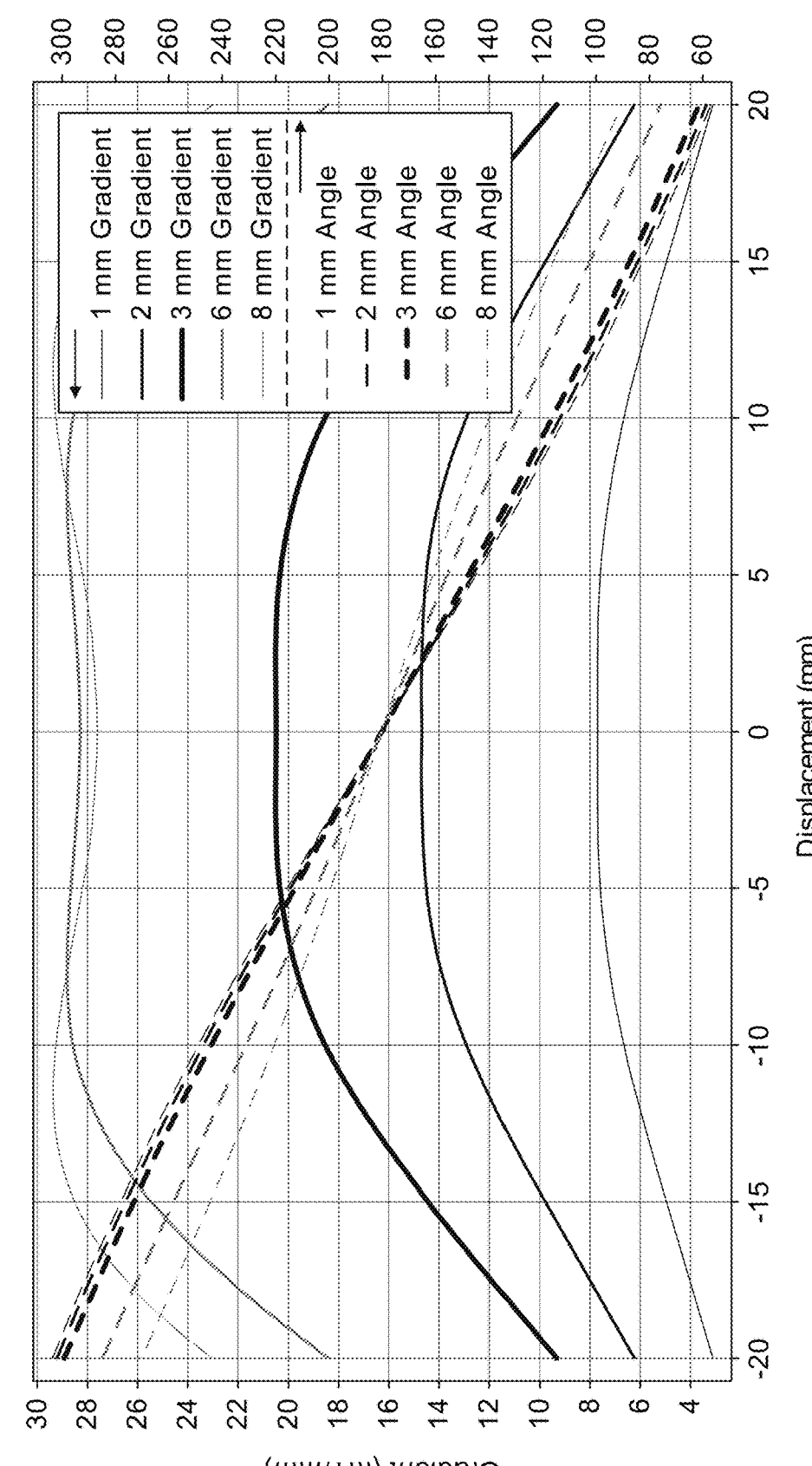
FIG. 6 is a graph showing simulations of the effect of the magnet width on the gradient and angular output in accordance with embodiments of the present invention.

We now refer to FIG. 6, showing the simulated results of the effect of the magnet width on the gradient and angular output. As can be seen, the width has a considerable impact on the useful gradient: the gradient strength decreases with lower width and stops increasing above a certain width. Together with the change in the gradient strength, the linearity of the angular output also drops for higher thicknesses. These thus indicate that the width may ideally be relatively thin (e.g. compared to the length, and/or to the spacing between the sensing elements).

Figure 7:
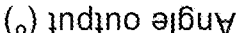
FIG. 7 is a graph showing simulations of the effect of the air gap on the gradient and angular output in accordance with embodiments of the present invention.

We now refer to FIG. 7, showing the simulated results of the effect of the air gap on the gradient and angular output. Alongside what is shown in FIG. 7, the air gap was moreover investigated in a broader range of 3 mm to 10 mm.

Overall, a fairly pronounced effect of the air gap could be observed, with larger air gaps having a weaker gradient and lower linearity of the angular output. Notwithstanding, for small variations in air gap of 100 µm, the gradient and angle change only by about 0.6%. Moreover, an angular output with a good default linearity and a good gradient strength are obtained over a wide range of air gaps.

Example 2: Proof-of-Concept

Alongside the above-mentioned simulations, a real-world proof-of-concept was also made. The setup was again akin to the one schematically depicted in FIG. 2 and FIG. 3, with a bar magnet magnetized along its width and having a length of 40 mm, width of 1 mm and height of 12 mm. The measurement was performed with the sensor on an XYZ movement stage, which moved a Melexis stray field immune Triaxis® sensor from outside to underneath the magnet over a total displacement (along the y-direction) of 24 mm (which was the limit of the XYZ movement stage). All the while, the magnet was held fixed in a configuration such that it magnetization direction was angled by about 80° with respect to the displacement direction, which allowed to transfer the 24 mm displacement into an effective stroke (along the x-direction) of a few millimetres.

Figure 8:
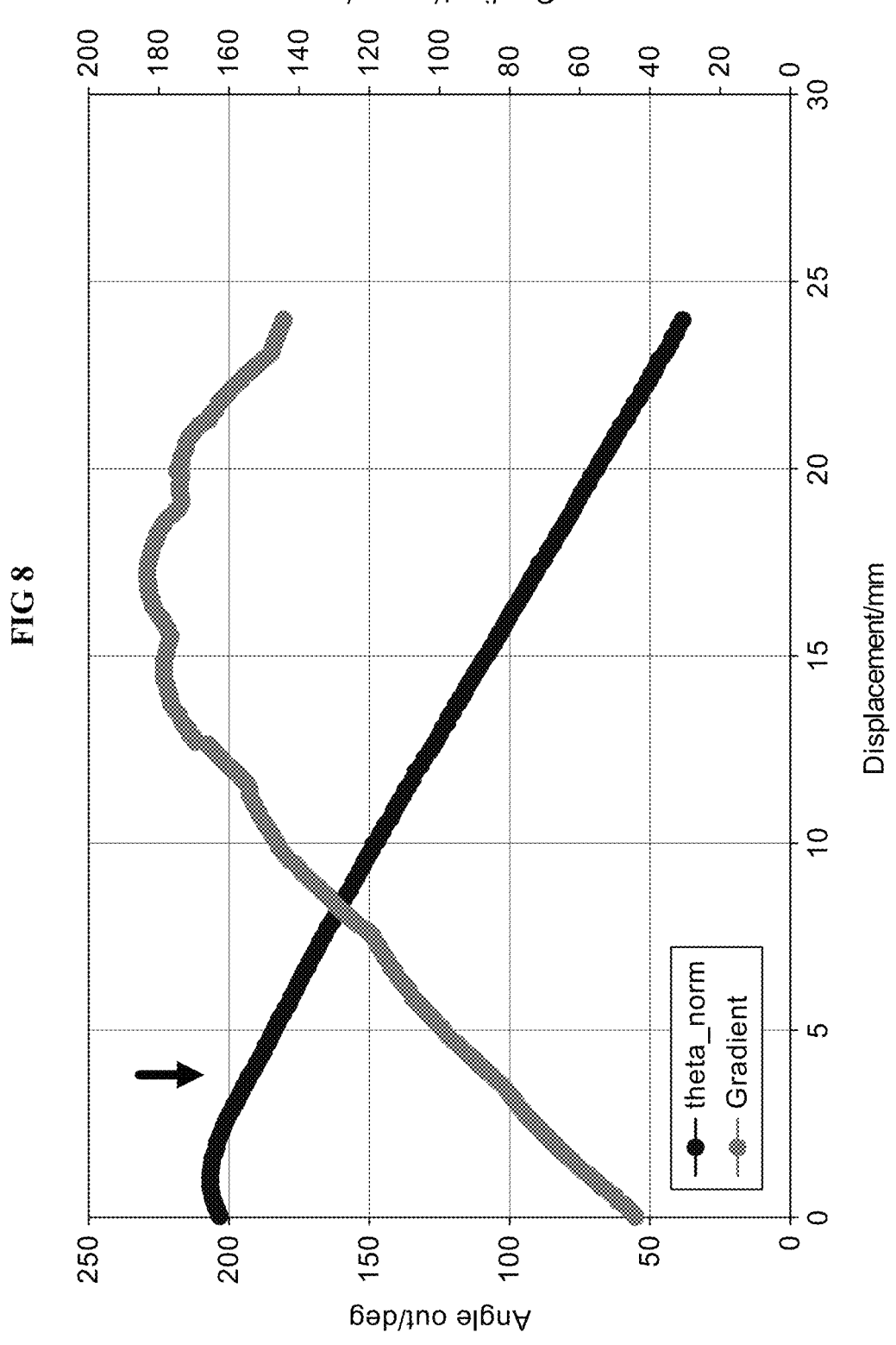
FIG. 8 is a graph showing the gradient and angular output measurements from a real-world proof-of concept in accordance with embodiments of the present invention.

We now refer to FIG. 8, showing the gradient and angular output measured during the above experiment; the arrow indicates the end of the magnet. As can be seen, the measurements show an angular output with a good default linearity and a gradient which is sufficiently large (i.e. >6 mT/mm) within the length of the magnet. Moreover, it could be deduced that the 24 mm displacement was just over half the possible range achievable with this arrangement of sensor and magnet (i.e. were it not limited by the movement stage).

It is to be understood that although preferred embodiments, specific constructions, configurations and materials have been discussed herein in order to illustrate the present invention. It will be apparent to those skilled in the art that various changes or modifications in form and detail may be made without departing from the scope of the invention as defined in the appended claims.

The invention claimed is:

1. A system for sensing a displacement along a direction y of a magnet relative to a sensor, comprising:
   i) a sensor for measuring
      a first magnetic field component $B_u$ along a direction u, and
      a second magnetic field component $B_z$ along a direction z, substantially orthogonal to u and y; and
   ii) a magnet above the sensor in the z-direction, the magnet having a magnetization direction perpendicular to a major surface of the magnet, substantially perpendicular to the z-direction and different from the y-direction;
   wherein the sensor comprises:
   ia) a first sensing unit for measuring in a first sensing region
      a first magnetic field component $B_{u,1}$ along the u-direction and
      a second magnetic field component $B_{z,1}$ along the z-direction, and
   ib) a second sensing unit for measuring in a second sensing region—aligned to the first sensing region along the u-direction—
      a first magnetic field component $B_{u,2}$ along the u-direction and a second magnetic field component $B_{z,2}$ along the z-direction;

wherein $B_{u,1}$ is measured at a first sensing spot, $B_{u,2}$ is measured at a second sensing spot, $B_{z,1}$ is measured at a third sensing spot, and $B_{z,2}$ is measured at a fourth sensing spot;

wherein the system is configured to calculate a difference $dB_u$ between $B_{u,1}$ and $B_{u,2}$ and a difference $dB_z$ between $B_{z,1}$ and $B_{z,2}$, and to determine the displacement of the magnet related to $$\frac{dB_u/_{du_1}}{dB_z/_{du_2}}$$

with $du_1$ a distance between the first sensing spot and the second sensing spot, and $du_2$ a distance between the third sensing spot and the fourth sensing spot.

2. The system according to claim 1, wherein the magnetization direction is at an angle of from 50° to 85° with the y-direction, preferably from 60° to 82°, more preferably from 70° to 80°.

3. The system according to claim 1, wherein the magnetization direction is perpendicular to a longitudinal direction of the magnet.

4. The system according to claim 1, wherein the magnet has a height parallel to the z-direction and a width parallel to the magnetization direction, and wherein an aspect ratio of the height to width is 1:1 or more.

5. The system according to claim 1, wherein the magnet has a length perpendicular to the z-direction and to the magnetization direction, the magnetization direction being at an angle θ with the y-direction; and wherein for sensing a displacement d the length is at least:

$$\frac{d}{\sin\theta}.$$

6. The system according to claim 1, wherein the magnet is a block magnet.

7. The system according to claim 1, wherein the magnet is over the sensor such that there is a space between the magnet and the sensor along the z-direction of between 0.5 and 10 times the width.

8. The system according to claim 1, wherein the magnet has a height parallel to the z-direction and a width parallel to the magnetization direction, and wherein an aspect ratio of the height to width is 1.5:1 or more.

9. The system according to claim 1, wherein the magnet has a height parallel to the z-direction and a width parallel to the magnetization direction, and wherein an aspect ratio of the height to width is 2:1 or more.

10. The system according to claim 1, wherein the magnet has a height parallel to the z-direction and a width parallel to the magnetization direction, and wherein an aspect ratio of the height to width is 2.5:1 or more.

11. The system according to claim 1, wherein the magnet is over the sensor such that there is a space between the magnet and the sensor along the z-direction of between 1 and 5 times the width.

12. The system according to claim 1, wherein the system is configured to calculate $dB_u$ from $k_u(B_{u,1}-B_{u,2})$ and/or to calculate $dB_z$ from $k_z(B_{z,1}-B_{z,2})$, wherein $k_u$ and $k_z$ are correction factors.

13. A method for sensing a displacement along a direction y of a magnet relative to a sensor, comprising:

a) measuring a first magnetic field component $B_u$ and a second magnetic field component $B_z$; and b) determining the displacement of the magnet from $B_u$ and $B_z$;

wherein the sensor comprises:

a first sensing unit for measuring in a first sensing region:

a first magnetic field component $B_{u,1}$ along the u-direction and a second magnetic field component $B_{z,1}$ along the z-direction, and a second sensing unit for measuring in a second sensing region—aligned to the first sensing region along the u-direction:

a first magnetic field component $B_{u,2}$ along the u-direction and a second magnetic field component $B_{z,2}$ along the z-direction;

wherein said determining the displacement of the magnet from $B_u$ and $B2_z$ comprises determining the displacement (d) of the magnet from $B_{u,1}1$, $B_{u,2}$, $B_{z,1}$, and $B_{z,2}$;

wherein $B_{u,1}$ is measured at a first sensing spot, $B_{u,2}$ is measured at a second sensing spot, $B_{z,1}$ is measured at a third sensing spot, and $B_{z,2}$ is measured at a fourth sensing spot;

wherein said determining the displacement of the magnet further comprises calculating a difference $dB_u$ between $B_{u,1}$ and $B_{u,2}$ and a difference $dB_z$ between $B_{z,1}$ and $B_{z,2}$; and wherein the determined displacement is related to $$\frac{dB_u/_{du_1}}{dB_z/_{du_2}}$$

with $du$ a distance between the first sensing spot and the second sensing spot, and $d_{u2}$ a distance between the third sensing spot and the fourth sensing spot.

14. The method according to claim 13, wherein—relative to the sensor—the magnet moves substantially parallel to the y-direction.

15. The method according to claim 13, wherein the magnet moves at a constant height above the sensor.

16. The method according to claim 13, wherein the determined displacement is related to $B_u/B_z$.

17. The method according to claim 13, wherein $dB_u$ is calculated from $k_u(B_{u,1}-B_{u,2})$ and/or $dB_z$ is calculated from $k_z(B_{z,1}31\ B_{z,2})$, wherein $k_u$ and $k_z$ are correction factors.

* * * * *